US011628558B2

(12) United States Patent
Bramberger

(10) Patent No.: US 11,628,558 B2
(45) Date of Patent: Apr. 18, 2023

(54) DEVICE, A SYSTEM AND A METHOD FOR BUILDING STATIONARY STRUCTURES ON A WORKING SURFACE

(71) Applicant: LIEBHERR-WERK BIBERACH GMBH, Biberach an der Riss (DE)

(72) Inventor: Robert Bramberger, Mittelstetten/Vogach (DE)

(73) Assignee: LIEBHERR-WERK BIBERACH GMBH, Biberach an der Riss (DE)

(*) Notice: Subject to any disclaimer, the term of this patent is extended or adjusted under 35 U.S.C. 154(b) by 136 days.

(21) Appl. No.: 16/092,120

(22) PCT Filed: Apr. 7, 2017

(86) PCT No.: PCT/EP2017/000448
§ 371 (c)(1),
(2) Date: Oct. 8, 2018

(87) PCT Pub. No.: WO2017/174201
PCT Pub. Date: Oct. 12, 2017

(65) Prior Publication Data
US 2019/0152051 A1  May 23, 2019

(30) Foreign Application Priority Data
Apr. 7, 2016 (DE) ...................... 10 2016 004 275.3

(51) Int. Cl.
*B25J 9/00* (2006.01)
*B28B 1/00* (2006.01)
(Continued)

(52) U.S. Cl.
CPC ............ *B25J 9/0078* (2013.01); *B28B 1/001* (2013.01); *B33Y 10/00* (2014.12); *B33Y 30/00* (2014.12);
(Continued)

(58) Field of Classification Search
CPC ......... B33Y 10/00; B33Y 30/00; B33Y 40/00; B33Y 70/00; B25J 9/0078; B28B 1/001; E04B 1/3505; E04G 21/0418; B29C 67/00
See application file for complete search history.

(56) References Cited

U.S. PATENT DOCUMENTS

| 5,440,476 A | * | 8/1995 | Lefkowitz | ............ | G05B 19/251 212/76 |
| 5,585,707 A | * | 12/1996 | Thompson | ................. | B25J 5/00 318/568.1 |
| 6,809,495 B2 | * | 10/2004 | Rodnunsky | ............. | B66C 13/08 104/180 |

(Continued)

FOREIGN PATENT DOCUMENTS

| CN | 2898302 Y | 5/2007 |
| DE | 3236510 A1 | 4/1984 |
| DE | 102014015335 A1 | 4/2016 |

OTHER PUBLICATIONS

ISA European Patent Office, International Search Report Issued in Application No. PCT/EP2017/000448, dated Jun. 26, 2017, WIPO, 4 pages.
Intellectual Property India, Examination Report Issued in Application No. 201817038668, dated Feb. 2, 2021, 7 pages.

*Primary Examiner* — Joseph S Del Sole
*Assistant Examiner* — Baileigh Kate Darnell
(74) *Attorney, Agent, or Firm* — McCoy Russell LLP

(57) ABSTRACT

An example device for building stationary structures on a work surface includes a scaffold, which is arranged around the work surface. In the example, a working head is provided, which, with the help of multiple control cables is held on the scaffold and arranged above the work surface, upper control cables are provided, which run above the working head from the scaffold, lower control cables are provided, which run below the working head from the scaffold, all (Continued)

control cables can be extended out of the scaffold and retracted to the scaffold, in order to change a position of the working head, and a control unit is provided, which is connected with actuators for the extending and retracting of the control cables, and is configured to actuate these actuators to change the position of the working head.

20 Claims, 3 Drawing Sheets

(51) Int. Cl.
    *B33Y 10/00*    (2015.01)
    *B33Y 30/00*    (2015.01)
    *E04B 1/35*    (2006.01)
    *E04G 21/04*    (2006.01)

(52) U.S. Cl.
    CPC ........ *E04B 1/3505* (2013.01); *E04G 21/0418* (2013.01)

(56) References Cited

U.S. PATENT DOCUMENTS

| | | | |
|---|---|---|---|
| 6,826,452 B1 | 11/2004 | Holland et al. | |
| 7,753,642 B2 * | 7/2010 | Bosscher | B25J 17/0266 |
| | | | 414/735 |
| 9,048,779 B2 * | 6/2015 | Szarzynski | B25J 9/0078 |
| 9,206,601 B2 * | 12/2015 | Khoshnevis | B29C 48/0016 |
| 10,471,590 B1 * | 11/2019 | Vachon | B25J 9/1623 |
| 2003/0236588 A1 * | 12/2003 | Jang | B82Y 30/00 |
| | | | 977/839 |
| 2005/0196484 A1 * | 9/2005 | Khoshnevis | B29C 64/106 |
| | | | 425/463 |
| 2009/0066100 A1 | 3/2009 | Bosscher et al. | |
| 2013/0292039 A1 * | 11/2013 | Peters | B33Y 30/00 |
| | | | 156/168 |
| 2013/0314460 A1 * | 11/2013 | Orr | B41F 17/006 |
| | | | 347/2 |
| 2014/0069222 A1 * | 3/2014 | Souk | B25J 9/0078 |
| | | | 74/490.02 |
| 2017/0350115 A1 * | 12/2017 | Rocher | E04B 1/35 |

* cited by examiner

DEVICE, A SYSTEM AND A METHOD FOR BUILDING STATIONARY STRUCTURES ON A WORKING SURFACE

CROSS-REFERENCE TO RELATED APPLICATIONS

The present application is a U.S. National Phase of International Patent Application Serial No. PCT/EP2017/000448, entitled "DEVICE, A SYSTEM AND A METHOD FOR BUILDING STATIONARY STRUCTURES ON A WORKING SURFACE," filed on Apr. 7, 2017. International Patent Application Serial No. PCT/EP2017/000448 claims priority to German Patent Application No. 10 2016 004 275.3, filed on Apr. 7, 2016. The entire contents of each of the abovementioned applications are hereby incorporated by reference in their entirety for all purposes.

TECHNICAL FIELD

The invention relates to a device, a system and a method for building stationary structures on a work surface.

BACKGROUND AND SUMMARY

The technology of 3D printing, in which three-dimensional objects are produced through free spraying of plastic materials onto a work surface, is known. Here, the printer uses a file with information about the three-dimensional shape of the object to be produced, in order correspondingly actuate a nozzle moveably arranged over the work surface with regard to position and output. Until now, this technology was, however, substantially limited to applications, in which plastic materials came into use, and the produced object, after its completion, is removed from the working surface. Through corresponding insertion of prefabricated additional parts, the production of heterogenous objects is also conceivable.

It is likewise known to use so-called shotcrete in the production of stationary concrete components. For example, in the wet-spraying method, cement, aggregates, and water are mixed together, and, by means of a mortar pump, are conveyed to a spray nozzle, from where the mixture is atomized and applied by means of the compressed air added inside the nozzle. Besides that, the dry-spraying method is also known, in which cement and aggregate are mixed together dryly and, in a compressed-air stream, are conveyed free-floatingly through a pipe- or hose line to a mixing nozzle. In the nozzle region, water is supplied to the dry mixture, in order to provide the mixture with the necessary mixing water, and subsequently, the mixture is applied in an uninterrupted jet.

It is the object of the invention to provide a device and a system, in order to, on the basis of the technology of 3D printing, make a semi-automation or automation in the building of stationary objects possible. Moreover, a method for using devices and systems of this type shall be provided.

Against this background, the invention relates to a device for building stationary structures on a work surface, wherein the device comprises a scaffold which is arranged around the work surface, wherein a working head is provided which, with the help of multiple control cables, is held on the scaffold, and is arranged above the work surface, wherein upper control cables are provided, which run above the working head from the scaffold, wherein lower control cables are provided, which run below the working head from the scaffold, wherein all control cables can be extended out of the scaffold and can be retracted to the scaffold, in order to change the position of the working head, and wherein a control unit is provided, which is connected with actuators to extend and retract the control cables, and is configured to actuate these actuators to change the position of the working head.

The work surface includes the entirety of the horizontal positions on which the working head can be arranged. It therefore has the shape of a polygon, whose endpoints are defined through those corner points of the scaffold, at which the control cables run off the scaffold. Of course, the work surface can also be arbitrarily defined within these borders.

In one embodiment, the number of upper control cables corresponds to the number of lower control cables, wherein corresponding pairs of upper and lower control cables preferably extend over one another.

In one embodiment, at least three upper control cables and/or at least three lower control cables are provided. In one embodiment, exactly four upper and exactly four lower control cables are provided.

In one embodiment, the control cables are fiber ropes. This ensures a suitable flexibility and tensile strength of the cables. Examples include synthetic fibers, such as polyester or the like.

In one embodiment, at least one of the control cables includes a power line and/or a data line. Thus, the working head can be supplied with power, or an unhindered dataflow can be ensured.

In one embodiment, the working head includes a communications unit with an interface for wireless communication for receiving data.

In one embodiment, the scaffold continuously surrounds the working surface.

In one embodiment, the scaffold consists of scaffolding elements discontinuously distributed around the work surface.

Since the places of the scaffold, at which the control cables run from the scaffold, define a regular polygon, the continuous scaffold can also have the form of a regular polygon, or the scaffolding elements of the discontinuous scaffold can be arranged at endpoints of the polygon. As long as four upper and/or four lower control cables are provided, the places of the scaffold, at which the control cables run from the scaffold, can define a rectangle. Correspondingly, the scaffold can have the shape of a rectangle. The same is true for three upper and/or lower control cables (triangle), five upper and/or lower control cables (pentagon), and further numbers of control cables.

In one embodiment, each control cable is assigned a distinct actuator.

In one embodiment, each actuator includes a drive motor, preferably an electric motor, and/or a guide wheel for the control cable.

In one embodiment, the control cables are fixedly anchored in the working head. The control cables can, in this embodiment, therefore not be extended from the working head, or be retracted into said working head.

In another embodiment, the upper control cable of a pair is redirected at the working head and, as the lower control cable of the same pair, leads back to the scaffold. In this embodiment, a common actuator can be provided on the scaffold for the upper and lower control cable of the pair.

In one embodiment, the scaffold, and in particular the places of the scaffold, from which the control cables run, is/are height-adjustable. For this purpose, the scaffold can, for example, comprise a mechanical, pneumatic, magnetic, or combined system, by means of which the entire scaffold or parts of the scaffold can be raised and/or lowered. Suitable mechanical systems involve, for example, traction cables.

In one embodiment, the working head includes or holds a nozzle for a sprayable building material and preferably, shotcrete, which preferably, by means of a line, is communicated with a material source. This makes the building of three-dimensional stationary objection on the work surface possible by spraying concrete.

In one embodiment, the working head includes a lifting device for prefabricated components. This makes the preferably automated or semi-automated transport of prefabricated components from a magazine located within the range of the working head which, in the simplest case, can be formed through an open surface or platform, to a target position on the work surface possible. Thus, not only an automated or semi-automated building of homogenous structures, but rather also an automated or semi-automated building of heterogenous structures is made possible.

In one embodiment, the lifting device includes a gripping device and/or a suction device. The latter can serve to transport objects with a smooth outer surface, such as for example tiles or glass panes.

In one embodiment, the device serves to automatedly build stationary structures on a work surface on the basis of information about the three-dimensional shape of these structures, wherein the control unit actuates the actuators on the basis of this information. The information can originate from a control file, which can, for example, be a BIM or CAD file. The control file can be stored either in the control unit or on an external location on a computing unit. In the latter case, the device includes a communications unit, which makes possible the receiving of data from an external computing unit, either cable-free or by the use of cables.

As regards the control file, the use of so-called digital building structure data models for the construction and processing of edifices based on a device according to the invention is thus intended. Such a manner of digital building structure data model can, based on the so-called Building Information Modelling (BIM) be created, and the database contains digital information about the edifice to be constructed or to be processed. Such building structure data models, or BIM models, are computer-readable files or file conglomerates and, if necessary, processing computer program modules for processing such files, in which information and characteristics, which describe the edifice and its relevant properties in the form of digital data are contained. In particular, such building structure data models can contain CAD files to visualize the edifice, or parts thereof, and also include other relevant information about the edifice, for example a timetable for its construction, or logistical information about required tools. The building structure data model can be sent digitally, and thus be made available to the control unit of the device.

In the context of the present invention, it is provided in one embodiment that the operation of the cable robot is controlled based on the data of a BIM or building structure data model. The data can be stored locally in the device, or can be retrieved externally, for example through a LAN connection or wirelessly, for example via the internet.

The invention therefore also concerns a system, including a device according to the invention and an external computing unit, wherein the external computing unit and the device according to the invention each comprises a communications unit, in order to make a data transmission from the external computing unit to the device according to the invention possible. Suitable communications paths include, for example, LAN and/or WWW.

In one embodiment, a detection device is provided, which can recognize structures on the working surf, and can transmit information to the control unit or an eternal computing unit. The detection unit can be arranged on the device itself, or externally, in order to form a system, including the device according to the invention and the external detection unit and, if necessary, an external computing unit. Based on the assessment of the data of the detection unit, the building progress can be recognized, and/or a quality check can be carried out.

In one embodiment, a crane is provided in order to form to a system including the device according to the invention and the crane and, if necessary, furthermore an external detection unit and/or an external computing unit. The crane can, for example, be a slewing tower crane. Here, the crane can act as a transporting device, in order to pick up, for example, materials for the building material source and/or components for the magazine, or to transport components onto the working surface and/or structures.

In one embodiment, it is provided that the system includes a sensor for monitoring the building progress, which can, for example, be arranged on the crane. Suitable sensors include, for example, ultrasound-, radar-, infrared-, or laser sensors. Based on such sensors, a monitoring of the building progress can be undertaken, wherein the measuring data of the sensors can be compared with the database from, for example, a BIM model. Modifying the control data on the basis of the comparison can be provided, if a deviation from target is determined, which should be compensated for.

The crane can likewise comprise a control unit and a communications unit, so that control information can be received by an external computing unit.

The invention also relates to a method for building stationary structures on a work surface while using a device according to the invention or a system according to the invention, wherein a sprayable building material is sprayed out of the nozzle of the working head onto the work surface, or onto existing structures on the work surface. The building of the structures preferably occurs through free-form spraying, that is without the use of formwork. Alternatively, formwork can also be used.

In one embodiment, the sprayable building material is shotcrete, and the method or the device serve to build stationary structures out of or including concrete. In one embodiment, the method relates to a wet-spraying method. Alternatively, it can also relate to a dry-spraying method.

Within the scope of the method according to the invention, it can be provided that the movement of the working head and/or the output of the sprayable building material are controlled based on information from the control file. The movement of the working head is caused through the retracting and extending of the control cables.

Additionally, within the scope of the method according to the invention, it can be provided that the transportation of prefabricated components onto the work surface, or on the work surface is controlled based on information from the control file. The lifting device is thus actuated.

BRIEF DESCRIPTION OF THE FIGURES

Further details and advantages of the invention result from the exemplary embodiment explained by means of the figures.

DETAILED DESCRIPTION

Figure 1:
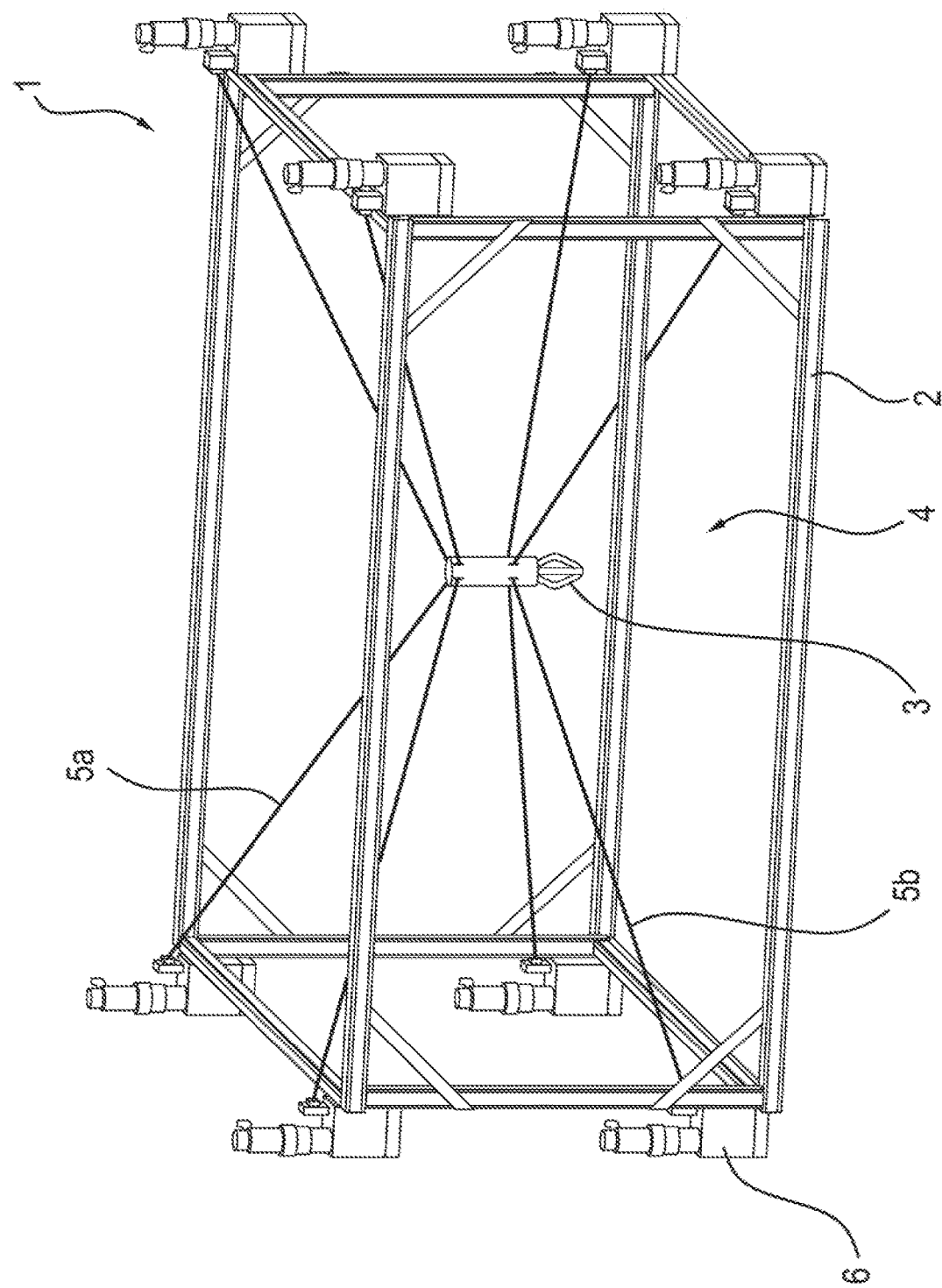
FIG. 1 shows an illustration of a device according to the invention.
Figure 2:
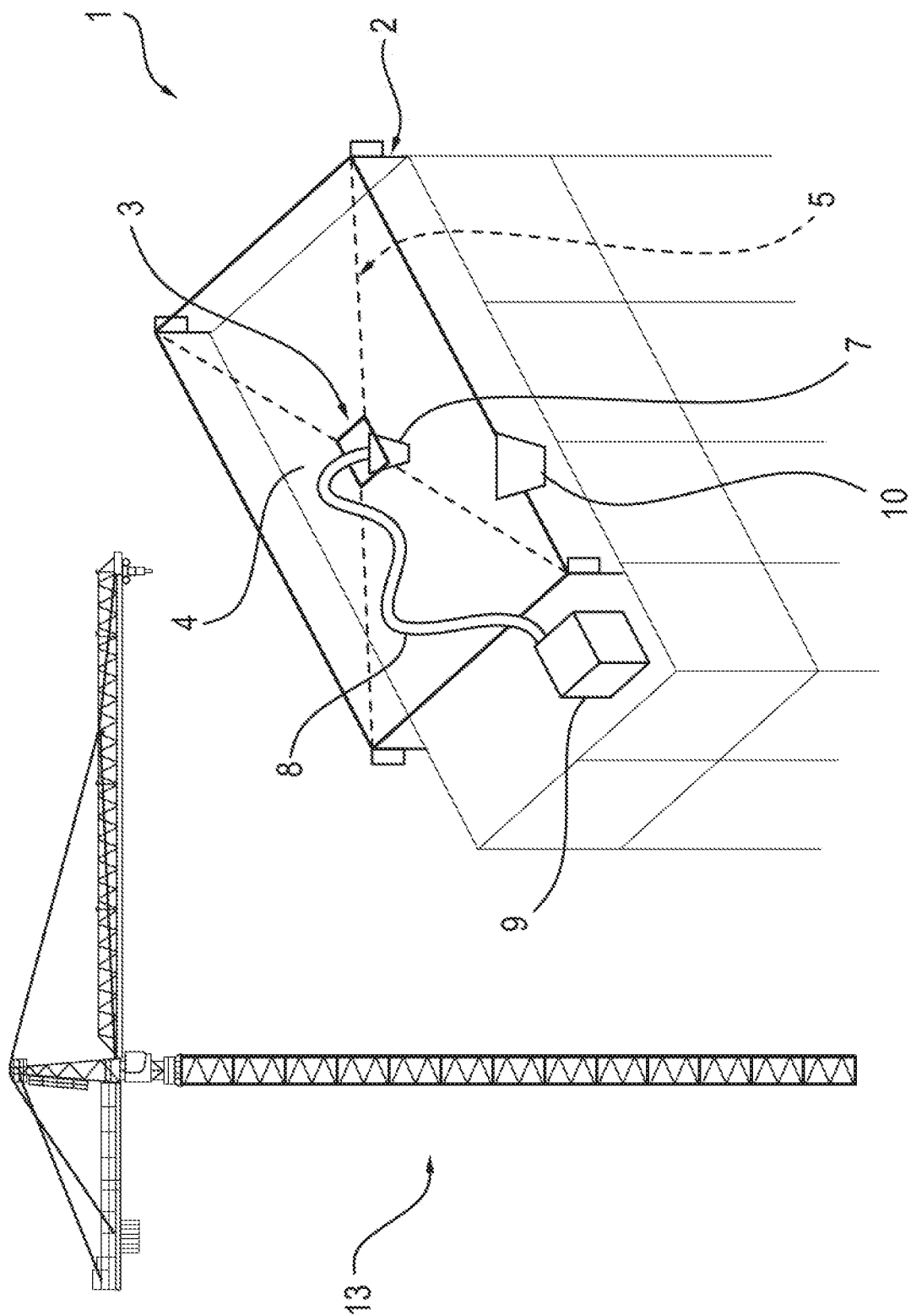
FIG. 2 shows an illustration of a system according to the invention, including the device according to FIG. 1 and a slewing tower crane.
Figure 3:
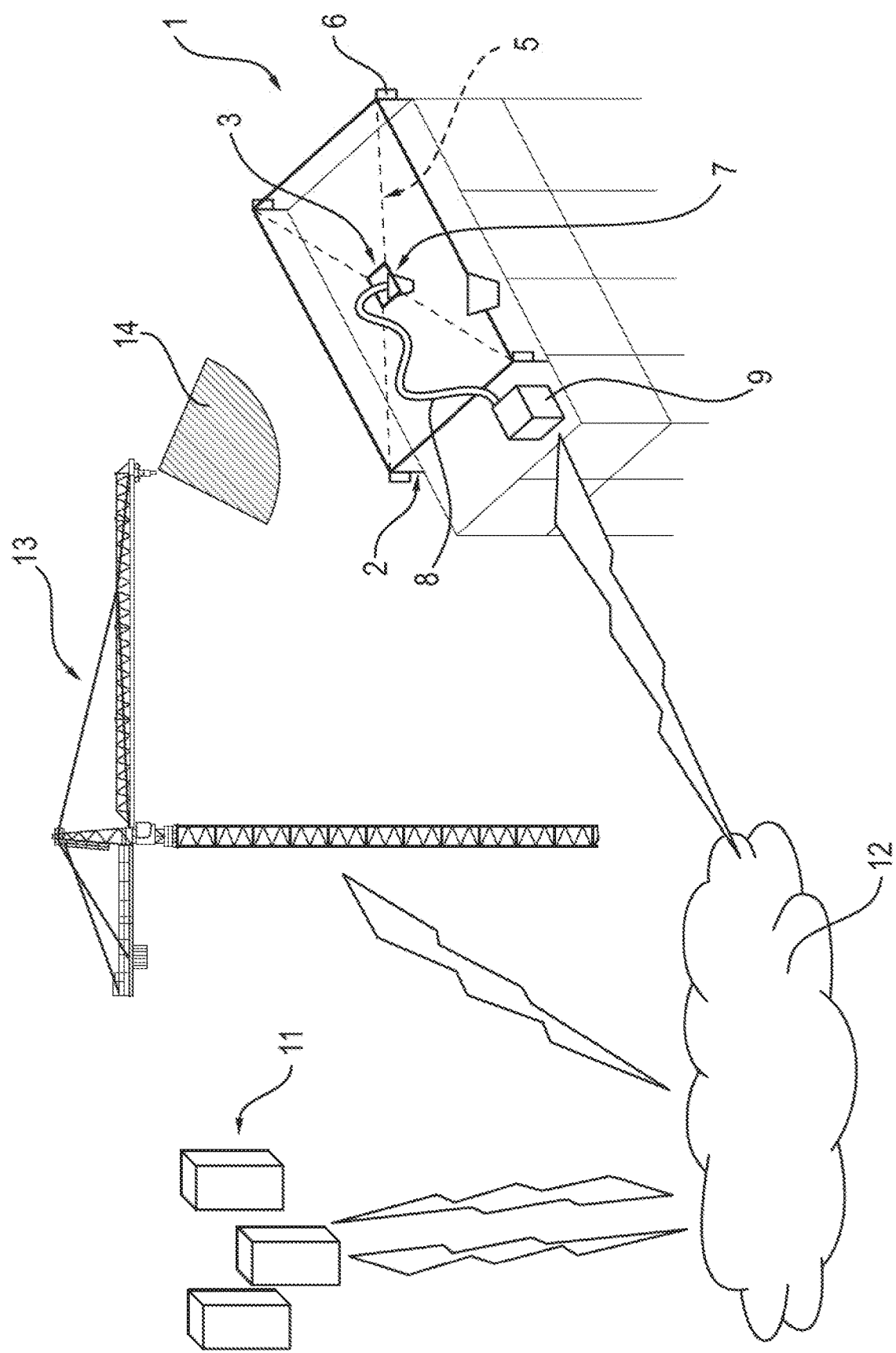
FIG. 3 shows an illustration of a system according to the invention, including the device according to FIG. 1, a slewing tower crane and an external computing unit.

The device according to the invention is generally indicated with the reference character 1. It includes a scaffold 2 and a working head 3, wherein the scaffold 2 surrounds a work surface 4. The working head 3 is held on the scaffold 2 with four pairs of upper control cables 5a and lower control cables 5b, and is arranged above the work surface 4. The upper control cables 5a run above the working head 3 from the scaffold 2, and the lower control cables run below the working head 3. All control cables are fixedly anchored in the working head 3. The control cables 5a and 5b are all fiber ropes. In one of the lower control cables 5b, a power line and a data line is integrated, in order to supply the working head with power, and in order to ensure a frictionless data flow.

The control cables 5 are mounted on the scaffold 2 such that they can be extended out of the scaffold 2, and retracted to the scaffold 2, in order to change the position of the working head 3 above the work surface 4. Electric motors 6 are provided for this purpose in the mounting region of all control cables 5.

A control unit (not illustrated in greater detail in the figures) actuates the electric motors 6 on the basis of control information, in order to control a movement of the working head 3 over the work surface 4.

The scaffold 2 is continuously arranged around the work space 4 and has the shape of a rectangle. Based on a height-adjustment system not further represented in the figures, it can be lifted as a whole.

The working head 3 holds a nozzle 7 for shotcrete, wherein the nozzle 7 is communicated with a concrete source 9 by means of a line 8. The working head can moreover comprise a lifting device not represented in the figure in detail, in order to transport prefabricated components from a magazine 10 to a target position on the work surface 4. In this case, it can be a gripping device or a suction device, for example.

The control information for the control unit originates from a control file, which is stored on an external computing unit 11. The external computing unit 11 and the device 1 according to the invention each comprise a communications unit not further represented in the figure, to enable a transmission 12 of the control information of the control file from the external computing unit 11 to the device 1 according to the invention. The control information here is obtained from a BIM model.

In one embodiment, a detection unit not further represented in the figure is provided, which can recognize structures on the work surface, and can transmit information to the control unit or on the transmission path 12, to the external computing device 11.

Moreover, a slewing tower crane 13 is provided, in order to transport materials for the concrete source 9 and components for the magazine 10. The crane 13 likewise comprises control- and communications units not further illustrated, in order to be able to receive control information from the external computing unit 11.

The device 1, the external control unit 11 and the crane 13 can, within the scope of the automated or semi-automated construction of three-dimensional stationary structures on the work surface 4, interact on the basis of the control information from the control file. Here, shotcrete is freely sprayed on the work surface 4 in the wet- or dry-spray methods. The movement of the working head 3 and the output of the shotcrete are controlled based on information from the control file. The movement of the working head 3 is caused through the retracting and extending of the control cables 5, wherein the control unit actuates the motors 6 based on information from the control file. Additionally, through movement of the working head 3 and actuation of the lifting device, a transport of the prefabricated components from the magazine 10 onto the work surface 4 and on the work surface 4 can occur.

Reference character 14 indicates a monitoring field on the crane, which is supposed to symbolize a section of the detection region of a sensor, which is arranged on the crane, and is communicated with the external computing unit 11. Based on this sensor, the construction progress is monitored, and the external computing unit 11 is configured such that the measuring data received from the sensor can be compared with the database out of the BIM model. If a deviation from the target is determined, the control data for the cable robot is modified, in order to compensate for the deviation.

The invention claimed is:

1. A device for building stationary structures on a work surface,
   wherein the device comprises a scaffold, which is arranged around the work surface,
   wherein a working head is provided, which, with help of multiple control cables, is held on the scaffold and is arranged above the work surface,
   wherein upper control cables are provided, which run above the working head from the scaffold,
   wherein lower control cables are provided, which run below the working head from the scaffold,
   wherein all control cables are extendable out of the scaffold and retractable to the scaffold, in order to change a position of the working head,
   wherein a control unit of the device is provided, which is connected with actuators for the extending and retracting of the upper control cables and the lower control cables, and is configured with control data received from an external computing unit to actuate the actuators to change the position of the working head, the working head holding a nozzle, wherein the nozzle is communicated with a concrete source via a line,
   wherein one of the actuators is positioned at each corner point of the scaffold,
   wherein the control data is modified based on a comparison of data received from a sensor monitoring construction progress to a Building Information Modelling (BIM) database, and
   wherein the control data of the control unit is further used to control a crane that is communicatively coupled to the external computing unit, the crane being separate from the working head and the scaffold.

2. The device according to claim 1, wherein a number of upper control cables corresponds to a number of lower control cables, wherein corresponding pairs of upper and lower control cables extend over one another, and/or wherein at least three upper control cables and/or at least three lower control cables and/or at least three pairs of control cables are provided, and/or wherein the control cables are fixedly anchored into the working head.

3. The device according to claim 1, wherein each of the multiple control cables is assigned a distinct actuator, and/or wherein each actuator includes a drive motor and/or a guide wheel for each of the multiple control cables.

4. The device according to claim 1, wherein at least one of the control cables includes a power line and/or a data line, and wherein the actuators each include a drive motor.

5. The device according to claim 1, wherein the scaffold continuously surrounds the work surface, or consists of scaffolding elements discontinuously distributed around the work surface, and/or wherein the scaffold is mounted or configured height-adjustably.

6. The device according to claim 1, wherein concrete from the concrete source is a building material source.

7. The device according to claim 1, wherein the working head includes a lifting device for prefabricated components, the lifting device including a gripping device and/or a suction device.

8. The device according to claim 1, wherein the control unit is configured to automatically or semi-automatically actuate the actuators via the control data to thereby change the position of the working head and output of a building material via the nozzle and/or a lifting device based on control information from a control file, wherein the control file includes a BIM file from the BIM database or CAD file, and wherein the sensor monitoring the construction progress is one of a plurality of sensors, and wherein the control data is modified based on the comparison of data received from the plurality of sensors, including the sensor.

9. A system comprising:
a device for building stationary structures on a work surface, the device comprising a scaffold, which is arranged around the work surface;
an external computing unit; and
a crane that is communicatively coupled to the external computing unit,
wherein a working head is held on the scaffold and is arranged above the work surface via multiple control cables, the multiple control cables including upper control cables and lower control cables,
wherein the upper control cables run above the working head from the scaffold,
wherein the lower control cables run below the working head from the scaffold,
wherein the upper control cables and the lower control cables are extendable out of the scaffold and retractable to the scaffold in order to change a position of the working head,
wherein a control unit of the device is connected with actuators for the extending and retracting of the upper control cables and the lower control cables, the control unit being configured with control data received from the external computing unit to actuate the actuators to change the position of the working head, the working head holding a nozzle, wherein the nozzle is communicated with a concrete source via a line,
wherein the actuators are positioned above the working head and below the working head,
wherein the control data is modified based on a comparison of data received from a sensor monitoring construction progress to a Building Information Modelling (BIM) database, and
wherein the control data of the control unit is further used to control the crane, the crane being separate from the working head and the scaffold.

10. The system according to claim 9, wherein the sensor is communicatively coupled with the external computing unit, and wherein the device and the external computing unit and/or the detection unit and/or the crane each comprises a communications unit for a reciprocal or unilateral data transmission.

11. The system according to claim 9, wherein the detection unit is configured to recognize structures on the work surface, and to transmit information about an appearance of the structures to the control unit or the external computing unit, wherein the detection unit includes the sensor monitoring construction progress, and wherein the control data is modified to compensate for a deviation from a target.

12. The system according to claim 9, wherein the sensor is coupled to the crane.

13. The system according to claim 9, wherein a number of upper control cables corresponds to a number of lower control cables, wherein pairs of upper and lower control cables extend over one another.

14. The system according to claim 9, wherein the upper control cables and the lower control cables are fixedly anchored into the working head.

15. The system according to claim 9, wherein the upper control cables include at least three upper control cables and/or wherein the lower control cables include at least three lower control cables.

16. A method for automated or semi-automated building of stationary structures on a work surface using a device, or a system, the method comprising:
spraying a sprayable building material via a line onto the work surface, or onto existing structures on the work surface out of a nozzle held or arranged on a working head; and
moving a magazine with prefabricated components via the working head,
wherein a movement of the working head is caused through a retracting or extending of control cables that are actuated by a control unit via control data,
wherein the control data is modified based on a comparison of data received from a sensor monitoring construction progress to a Building Information Modelling (BIM) database, and
wherein the sprayable building material that is sprayed is atomized shotcrete.

17. The method according to claim 16, wherein the control data is modified responsive to detecting a deviation from a target based on the comparison, wherein the modification of the control data compensates for the deviation, and wherein the shotcrete is atomized.

18. The method according to claim 16, wherein the control data is used to actuate movement of the working head and an output of the sprayable building material and transport of prefabricated components onto the work surface or on the work surface, wherein the control data of the control unit is further used to control a crane, and wherein the control data is based on information from a control file.

19. The method according to claim 16, wherein the device comprises a scaffold, which is arranged around the work surface, wherein the system comprises the device and an external computing unit, and/or a detection unit arranged on the device or externally, and/or a crane, wherein a working head is held on the scaffold and is arranged above the work surface via the control cables, wherein the control cables include upper control cables and lower control cables, wherein the upper control cables run above the working head from the scaffold, wherein the lower control cables run below the working head from the scaffold, wherein the upper control cables and the lower control cables are extendable out of the scaffold and retractable to the scaffold in order to change a position of the working head, wherein a control unit is connected with actuators for the extending and retracting of the upper control cables and the lower control cables, the control unit being configured to actuate the actuators to change the position of the working head.

20. The method according to claim 19, further comprising recognizing structures on the work surface via the detection unit, and transmitting information about an appearance of the structures from the detection unit to the control unit or the external computing unit.

* * * * *